(12) United States Patent
Throop

(10) Patent No.: US 9,346,498 B2
(45) Date of Patent: May 24, 2016

(54) GOOSENECK TOWING MODULE AND METHOD OF USE

(71) Applicant: TowHaul Corporation, Bozeman, MT (US)

(72) Inventor: Todd Throop, Bozeman, MT (US)

(73) Assignee: TowHaul Corporation, Bozeman, MT (US)

( * ) Notice: Subject to any disclaimer, the term of this patent is extended or adjusted under 35 U.S.C. 154(b) by 0 days.

(21) Appl. No.: 14/191,703

(22) Filed: Feb. 27, 2014

(65) Prior Publication Data

US 2015/0239514 A1 Aug. 27, 2015

(51) Int. Cl.
*B62D 53/06* (2006.01)

(52) U.S. Cl.
CPC .................................... *B62D 53/062* (2013.01)

(58) Field of Classification Search
CPC ..... B62D 53/061; B62D 53/065; B62D 53/08
USPC .......... 280/425.1, 425.2, 441.2, 402
See application file for complete search history.

(56) References Cited

U.S. PATENT DOCUMENTS

| 5,435,586 A * | 7/1995 | Smith ......................... 280/425.2 |
| 6,932,372 B2 * | 8/2005 | French et al. .............. 280/417.1 |
| 8,459,685 B2 * | 6/2013 | Wood et al. ................ 280/441.2 |

* cited by examiner

*Primary Examiner* — Joseph Rocca
*Assistant Examiner* — Felicia L Brittman
(74) *Attorney, Agent, or Firm* — Clark & Brody

(57) ABSTRACT

A gooseneck and towing module are used in conjunction with a turntable, pedestal, apron and lower lugs to tow a disabled haul truck. The towing module is designed to fit and connect to the disabled haul truck at the more substantial section of the frame by means of cables and shackles and/or pinned connections. With the end of the towing module locked in place, the main lift cylinders on the gooseneck can then be extended to cause the front portion of the towing module to seat against the bumper of the disabled haul truck. With continued extension of the main lift cylinders, the disabled haul truck will be lifted into the towing position, lifting the front tires off the ground.

8 Claims, 7 Drawing Sheets

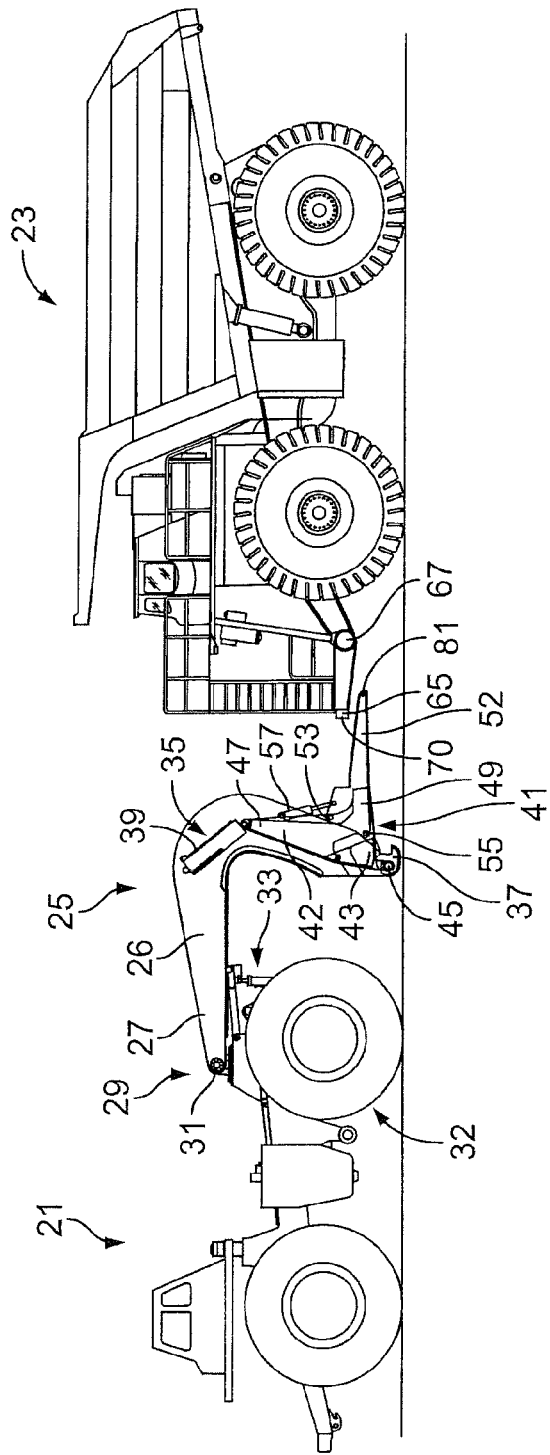
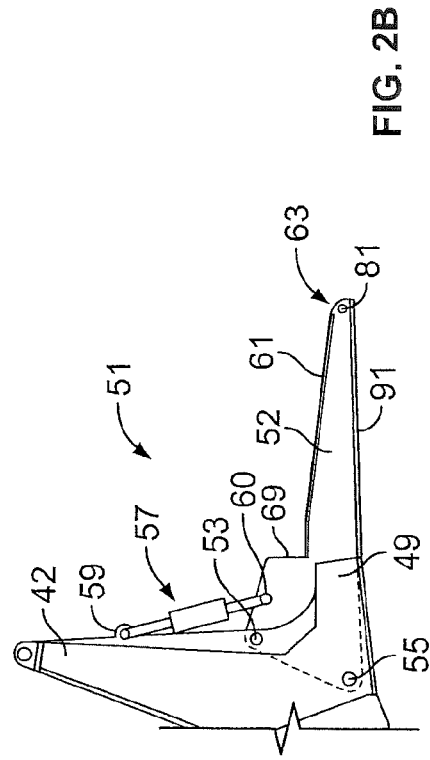
FIG. 2A
FIG. 2B

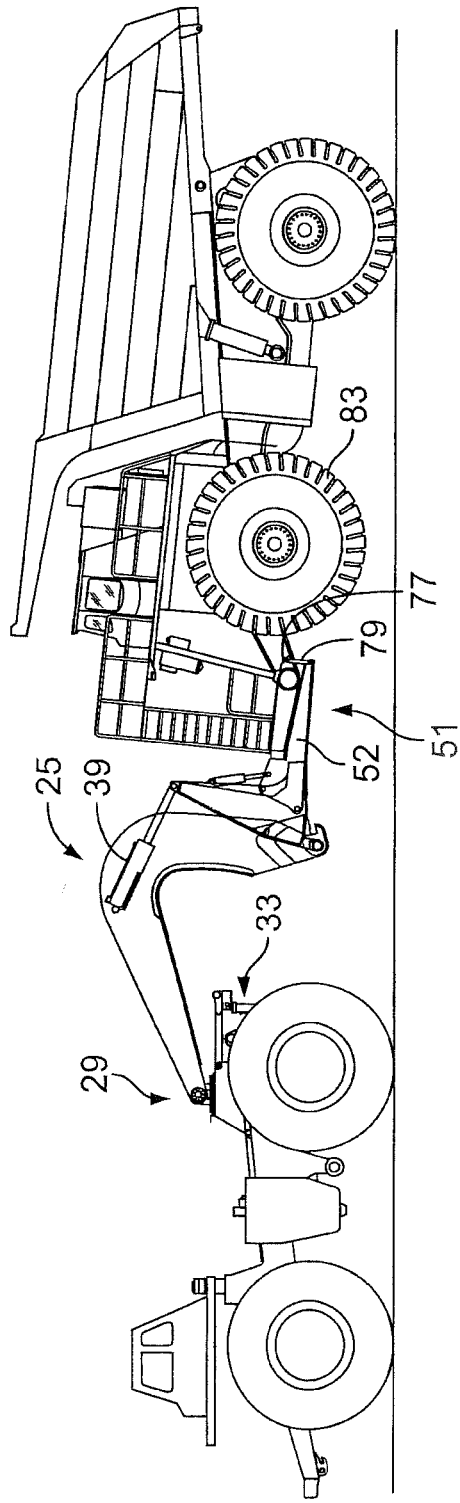
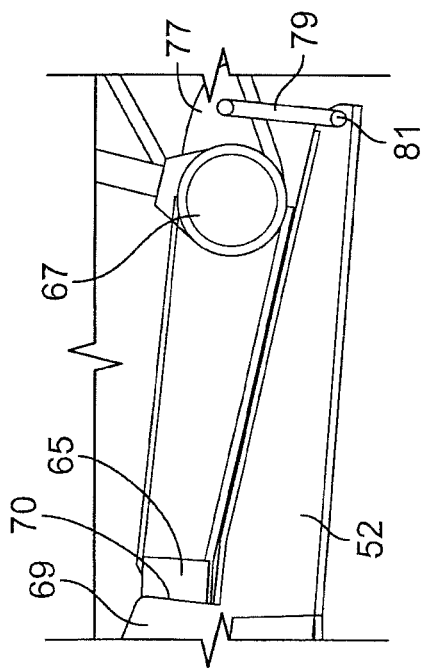
FIG. 3A
FIG. 3B

GOOSENECK TOWING MODULE AND METHOD OF USE

FIELD OF THE INVENTION

The invention relates to a gooseneck and towing module, and particularly to a gooseneck and towing module that provides an improved manner in towing a disabled vehicle.

BACKGROUND ART

U.S. Pat. No. 5,435,586 to Smith discloses a gooseneck apparatus for both hauling heavy equipment on a lowboy trailer and towing a disabled vehicle. FIG. 1 is illustrative of this type of apparatus and the gooseneck apparatus is designated by the reference numeral 10. The apparatus includes a gooseneck 1 mounted to a towing vehicle 3. One end of the gooseneck is pivotally mounted at 5 so that the gooseneck can swivel when hauling a trailer but not when towing a disabled vehicle 9 since the gooseneck is locked in the guide frame in the prior art towing configuration.

A hydraulic cylinder assembly 7 is mounted on the vehicle 3 and the assembly is designed to lift the entire gooseneck when towing a disabled vehicle 9. Since the assembly 7 is behind the rear axle/wheels 6 of the hauling vehicle 3, this method of towing causes an upward force at the coupling 5 between the gooseneck 1 and the towing vehicle 3 and a rotation about the rear axle/wheels 6 of the hauling vehicle 3. This causes the front tires 8 to lift off of the ground. Consequently, a counterweight assembly 11 is required at the front of the towing vehicle 3 to keep the desired weight on the front tires of the prime mover.

The gooseneck 1 has a toe 12 that has a dual function. In one mode as the hauling mode, the toe 12 is used and moved in conjunction with the hook 13 to haul a lowboy trailer as is known in the art. In the towing mode, the toe 12 is not moved for towing. Instead, the toe 12 is lowered by movement of the gooseneck 1 due to the cylinder assembly 7 and the end 14 of the toe 12 attached to the underside of the bumper 15 of the disabled vehicle 9. The gooseneck 1 is lifted by reason of the cylinder assembly 7 to raise the front tires 16 of the disabled vehicle 9 off of the ground. The towing vehicle 3 can then tow the disabled vehicle to the appropriate location. In one mode, the end 14 of the toe 12 has a trunnion pin 17 that mates with an appropriate recess in the bumper 15 for towing purposes.

This method of towing has a number of problems as outlined below.

As the trucks get larger and the goosenecks get bigger, a larger counterweight is required. Because the counterweights are getting so large, they are made in two or three pieces to allow for shipping and handling. This requires more handling by mine personnel when going back and forth between the lowboy trailer hauling configuration and towing configuration. And, there's a theoretical limit to how much counterweight can be attached to the front of a towing vehicle.

The existing towing method requires a different set of truck components than a non-towing configuration (the non-towing configuration designed only to haul lowboy trailers) in order to slide the gooseneck forward on the towing vehicle to help reduce the amount of counterweight needed. This adds many components, e.g., subframe, guide frame, slide cylinder lug, slide cylinders, larger apron cylinders (which are analogous to the cylinder assembly 7 in FIG. 1), etc. which adds complexity and the inherent issues that come with that. Because of that, it is a substantial retrofit and cost for a mine to upgrade from non-towing to towing. These towing/hauling configurations and non-towing configurations are well known and a further description of the details of the towing vehicle components is not necessary for understanding of the invention.

The existing method also requires someone under the disabled vehicle relaying signals to another person standing beside the truck that gives directions to the operator in the towing vehicle in order to get the end of the toe 14, which has the trunnion pin 17 lined up correctly. It usually takes several tries "forward and back" and "side to side" to make the connection and it puts the person under the truck in a dangerous situation. This is even more difficult with the electric trucks because they tend to "lurch", making it tough to get lined up correctly.

There is not a positive connection between the towing vehicle and the disabled vehicle and this is a problem.

There is a limited turning radius in the towing configuration. This is because the rotation point is at the center of the front bumper 15 and a part of the toe 12 can contact the bumper if the turn is too sharp. Also, the operator of the towing vehicle doesn't have a clear view of this area to determine when he is at the maximum turning capability.

SUMMARY OF THE INVENTION

The present invention provides an improved gooseneck assembly for towing disabled vehicles and hauling equipment using a lowboy trailer or the like.

In one embodiment, the present invention provides a gooseneck assembly comprising a gooseneck adapted with one end to be mounted to a hauling vehicle for pivoting on a horizontal axis and rotating on a vertical axis. The assembly includes a toe having a first end rotatably mounted to the gooseneck, a second end movably mounted to the gooseneck, and a third end, the third end having a toe extension, the toe extension extending a length of the toe, the toe and toe extension movable between a first position where the toe extension can be attached to a disabled vehicle, and a second position, wherein the toe extension is used to lift a front end of a disabled vehicle. Means for attaching the toe extension to a frame portion of the disabled truck are provided to provide a more secure connection to the disabled truck and reduce the possibility of the disabled truck separating from the gooseneck assembly and causing a problem.

The toe extension can be movable between a storage position and an operative position, the operative position permitting towing of the disabled vehicle and the storage position permitting use of the toe for other hauling purposes. In this way, in certain operations like lifting a lowboy trailer to haul a large piece of equipment, the toe extension would not interfere or contact a portion of the lowboy trailer and prevent the lifting of the trailer.

The toe extension can be either removably attachable to the toe or can be made as an integral part thereof, for example, fabricating the toe originally with the toe extension or welding the toe extension on an existing toe. When removable, the toe extension could be attached using any kind of fastening, pins, rods, and the like.

The gooseneck assembly can be used with any type of a hauling vehicle having front and rear wheels. One end of the gooseneck assembly would be mounted ahead of the rear wheels and the vehicle would have a lifting assembly mounted thereto for raising and lowering the gooseneck.

The toe extension can have a shoulder, with the shoulder positioned along a length of the toe extension so that the shoulder abuts a front face of a bumper of the disabled vehicle. The toe extension can be sized in length so that a free end thereof extends to contact both a front bumper and a portion of a frame of the disabled vehicle.

The invention also includes the method of towing a disabled vehicle. The method comprises providing a towing vehicle having the inventive gooseneck assembly. The toe extension is positioned underneath a bumper and frame portion of a disabled vehicle and then an end of the toe extension is attached to the frame portion. With the toe extension securely connected to the disabled vehicle, the toe and toe extension of the gooseneck are pivoted with respect to the gooseneck and this pivoting lifts the front end of the disabled vehicle.

The gooseneck assembly can be used in conjunction with a turntable, pedestal, apron and lower lugs of a hauling vehicle to tow a disabled haul truck. The towing module is designed to fit and connect to the disabled vehicle like a haul truck at the more substantial section of the frame by means of cables and shackles and/or pinned connections or other means for attaching the toe extension to the disabled vehicle. With the end of the toe extension locked in place, the main lift cylinders on the toe of the gooseneck can then be extended to cause a portion of the toe extension to seat against the bumper of the disabled haul truck. With continued extension of the main lift cylinders, the disabled vehicle will be lifted into the towing position, i.e., lifting the front tires off the ground. It should be understood here that this is different from the prior art towing method that uses the cylindrical assembly 7 to lift the gooseneck. According to the invention, the toe assembly of the gooseneck is used for the lifting of the disabled vehicle. In the prior art method, the entire gooseneck is lifted for lifting a disabled vehicle and the toe is not moved for lifting purposes.

The invention also includes a method of hauling heavy equipment by lifting a lowboy trailer having the equipment on it. In this mode, a portion of the gooseneck is attached to a portion of the lowboy trailer. If the trailer is configured such that the toe extension does not interfere with the lifting of the trailer, the toe can pivot to lift the trailer as is known in the art. Alternatively, the toe extension is configured to be movable between an operative position for towing a disabled vehicle and a storage position, where the toe extension is moved so that it does not interfere with lifting a lowboy trailer.

BRIEF DESCRIPTION OF THE DRAWINGS

FIG. 2A shows a gooseneck assembly of the invention in a pre-towing position.

FIG. 2B shows a portion of the assembly of FIG. 2A enlarged to show greater detail.

FIG. 3A shows the gooseneck assembly of FIG. 2A in a position of lifting a disabled vehicle.

FIG. 3B shows a portion of the assembly of FIG. 3A enlarged to show greater detail.

DETAILED DESCRIPTION OF THE INVENTION

Figure 1:
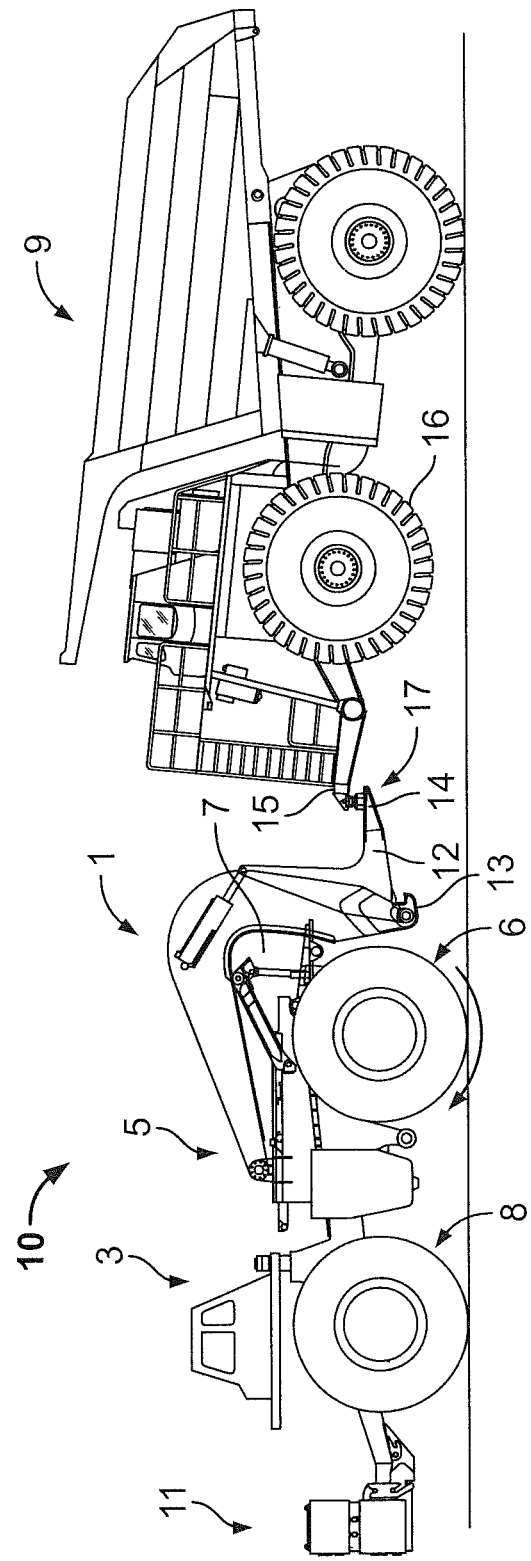
FIG. 1 shows a prior art gooseneck assembly for towing a disabled vehicle.

The inventive towing apparatus is advantageous in that it enables the use of the existing components of a gooseneck apparatus designed to haul lowboy trailers. This apparatus is modified by simply adding a towing module feature that either extends off the end of an existing toe or is configured to replace the existing toe of the gooseneck assembly.

One embodiment of the invention is shown in FIGS. 2A-7. FIGS. 2A and 2B show a towing vehicle 21 and a disabled vehicle 23. The towing vehicle 21 includes a gooseneck 26 and toe module assembly 25. One end 27 of the gooseneck 26 is coupled to the towing vehicle 21 at 29. This coupling allows the gooseneck 26 to pivot or move vertically, up and down about the horizontal axis of a pin or shaft 31. The coupling also permits the gooseneck 26 to rotate or swivel horizontally. Put another way, the end 27 can pivot on a horizontal axis of the shaft 31 and swivel on a turntable or the like, which is about a vertical axis. This type of coupling exists on the prior art gooseneck apparatus 10. It should be noted that the coupling 29 is ahead of the rear wheels 32, which provides an advantage in terms of weight distribution for lifting as is detailed below. It should be noted that the coupling does not need to slide like in the prior art apparatus so that the coupling is fixed in a location on the towing vehicle and the cost associated with having the sliding feature of the coupling is eliminated.

The towing vehicle 21 also includes an apron cylinder assembly 33, which is similar to that found in the prior art gooseneck apparatus 10. As explained below, the cylinders for this assembly can be made smaller since they do not perform the primary lifting when towing the disabled vehicle 23.

The gooseneck assembly 25 includes a main cylinder assembly 35 (one shown) and a hook 37 that are similar to those used in the prior art gooseneck apparatus 10. The cylinder assembly 35 includes cylinders 39 that operate to move a toe assembly 41 that includes a toe 42. The toe assembly 41 includes a first end 43, which is pivotally attached at 45 to the gooseneck 26, and a second end 47 that is attached to the main cylinder assembly 35. The toe assembly 41 in the illustrated embodiment has a third end 49, which is similar to the end of the prior art gooseneck apparatus 10. The assembly 41 includes a toe extension assembly 51 that includes the toe extension 52.

Figure 4:
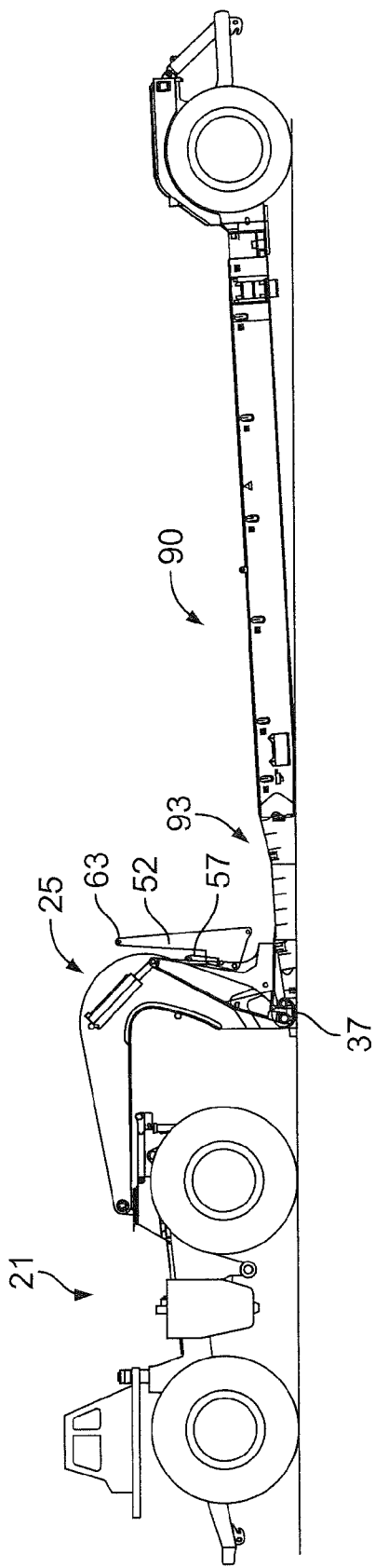
FIG. 4 shows the gooseneck assembly of FIG. 2 in a pre-hauling position for a lowboy trailer.
Figure 5:
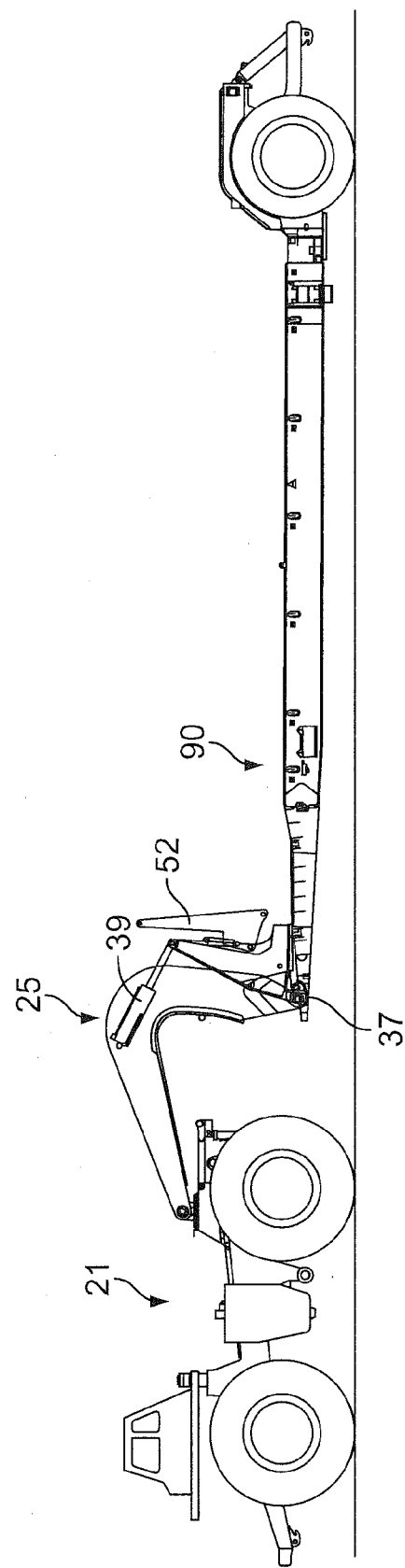
FIG. 5 shows the gooseneck assembly of FIG. 4 in a lifted state.
Figure 6:
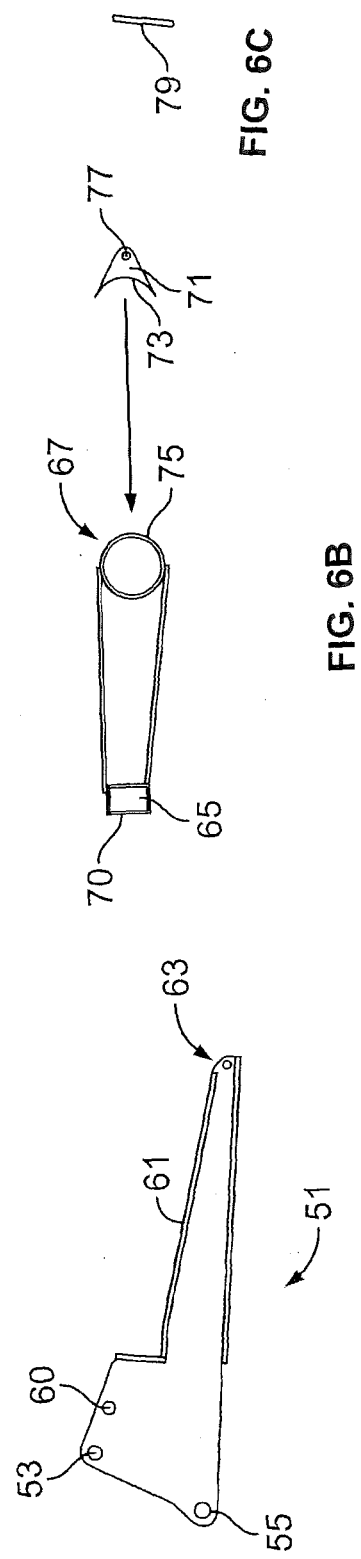
FIGS. 6A-6C shows different components of the gooseneck assembly of FIG. 2.

The toe extension assembly 51 is made movable between an operative position as shown in FIG. 2 and storage position as shown in FIGS. 4 and 5. The storage position is explained below. It should be understood that there are other embodiments for the toe extension assembly 51. One would be to make the toe extension assembly 51 integral with the third end 49 so that it is a one piece extension. That is, an extension could be welded onto an existing toe or the toe could be made in the configuration of the toe and toe extension if the gooseneck assembly is being made to order. This embodiment would be suitable where the toe extension would not interfere with the hauling of a lowboy. However, in many instances, the extension of the length of the toe means that the extended toe assembly would interfere with the lifting of a lowboy trailer and the embodiment having the operative and storage positions is preferred. Yet another embodiment would be to have the toe extension assembly 51 be mechanically fastened to the end 49 of the toe so that it could be attached when needed, and removed when lowboy hauling is required.

The toe extension assembly 51 is pivotally attached to the toe assembly 42 at 53 and is pinned at 55 to the toe 42. A cylinder assembly 57 is provided to move the toe extension 52 between the operative position shown in FIG. 2A and the storage positions in FIGS. 4 and 5. One end of the cylinder assembly 57 is attached to the toe 42 at 59 and the other end 60 is attached to the toe extension 52. The operation of this will be described in FIGS. 3A-B and 4.

The toe extension 52 is a ramp type structure that has a top surface 61 and a free end 63. The toe extension 52 can be self-guided into place as the operator backs the towing vehicle 21 into place. The towing extension can have three directional guiding features (horizontal side to side, horizontal front to back, and vertical) in order to reduce the amount of feedback needed from the operator. And, it will increase the safety at the same time by eliminating the need for someone to be under the disabled haul truck while the towing vehicle is moving into position.

As shown in FIG. 2A, the towing vehicle lowers the gooseneck assembly 25 so that the toe extension 52 is below the bumper 65 and frame portion 67 of the disabled vehicle 23. The towing vehicle moves the toe extension end 52 until the shoulder 69 seats against the bumper face 70 and the surface 61 is under the frame portion 67 of the disabled vehicle. The operator of the towing vehicle can now hold/lock the brakes thereof. A helper on the ground now has the opportunity to safely go under the disabled vehicle to attach the toe extension end 52 to the disabled vehicle for towing. The means for attaching the toe extension end 52 to a frame portion of the disabled vehicle can be any number of mechanical fastening to provide a locked connection between the toe extension end 52 and the frame portion and eliminate or reduce the risk of the disabled truck getting loose from the towing vehicle during towing.

Figure 7:
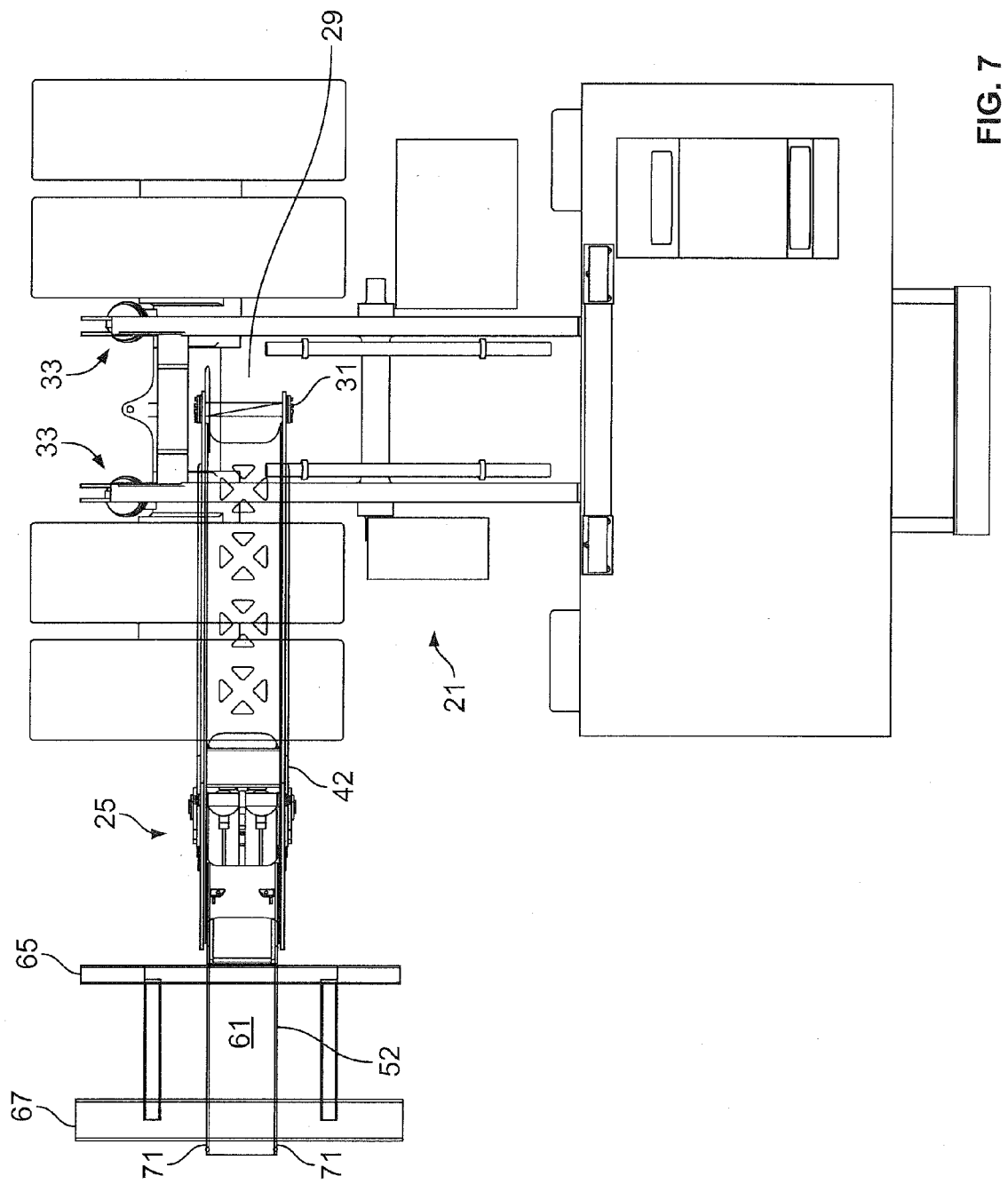
FIG. 7 shows a plan view of the gooseneck assembly, hauling vehicle, and portions of a disabled vehicle in a turning configuration.

One example of this means for attaching of the toe extension 52 to the truck frame is shown in FIGS. 3A-B, 6A-6C, and 7. FIGS. 6A-C shows the components used to facilitate the attachment of the toe extension 52 to the disabled vehicle 23 and FIG. 7 shows a schematic plan view of the towing vehicle 21, the gooseneck assembly 25, the toe extension 52, the bumper 65 and the frame portion 67 of the disabled truck. FIG. 6A shows the toe extension assembly 51 removed from the gooseneck.

FIGS. 6B show a pair of lugs 71. These lugs are pre-positioned on the frame portion 67 of the disabled vehicle. The lugs have a curved shape 73 that complements the curved shape 75 of the frame portion 67 and each lug has an opening 77. Shackles and cables, represented schematically as 79 in FIG. 6C are used to link the opening 81 in the free end 63 of the toe extension 52 to the openings 77 in the lugs 71. This not only links the toe extension end 52 to the frame portion of the disabled vehicle 23 but it also provides a locking mechanism to prevent the disabled vehicle 23 from becoming disconnected while being towed.

The use of the lugs 71 and shackles/cables 79 is one example of a means of attaching the toe extension end 52 to the frame portion 67. Other means could be employed for attaching the toe extension end 52 to a frame portion of the disabled vehicles. Pins could be used to link the toe extension end 52 and the actual frame portion 67 as one example. Virtually any mechanical fastening can be used to ensure that the toe extension end 52 is secured to the frame of the disabled vehicle so that the disabled vehicle cannot separate from the gooseneck assembly during towing.

Referring to FIGS. 3A and 3B now, once the toe extension end 52 is attached to the frame portion 67 of the disabled vehicle 23, the operator of the towing vehicle 21 can then extend the main lift cylinders 39 to fully seat the toe extension end 52 and its surface 61 on the bumper 65 of the disabled vehicle 23, if not already seated. With further extension of the main lift cylinders 39, the disabled vehicle 23 will be lifted until the front tires 83 are a suitable distance off the ground and in the towing position. Normally, the disabled vehicle 23 would be stabilized using chock blocks against the tires. The chock blocks would be moved and the disabled haul truck is ready to be towed. It should be noted that in FIG. 3, the apron cylinder assembly 33 is not used for the lifting of the disabled vehicle 23, which is completely different from the prior art technique as described in FIG. 1.

Referring to FIG. 7, the improved side-to-side rotation is illustrated. That is, the same side-to-side rotation that can be achieved when hauling a lowboy can be achieved when towing a disabled vehicle. This is because the coupling 29 is like that used for lowboy hauling and does not have to be moved toward the cab of the towing vehicle 21 as shown in FIG. 1. Thus, the gooseneck 26, the toe 42, and the toe extension 52 and their associated components and the disabled vehicle 23 will all rotate horizontally and vertically about the coupling 29 and coupling shaft 31 by the same means as when pulling the lowboy. This will allow for full 90° turns when towing a disabled vehicle. The weight distribution with the inventive apparatus will be similar to what is seen when pulling a lowboy and will eliminate the need for a counterweight or a sliding subframe on the towing vehicle as is required in the prior art.

As noted above, existing non-towing units can be easily retrofitted with the inventive design to allow greater functionality (i.e. towing) at a reduced cost. This design will also reduce lead times and downtimes when upgrading to towing.

The towing extension provides a means to connect to a stronger portion of the truck frame on the disabled vehicle to be towed. In a hookup configuration, where the towing module would attach to the disabled vehicle, apron cylinders on the hauling vehicle are used to help control the vertical position of the towing module. The means to connect or attach to the disabled vehicle can include guides and a system to pull the towing module into place and lock it in position. Then, the main lift cylinders on the gooseneck are engaged to extend the toe extension and seat the bearing pad or surface of the toe extension against the underside of the bumper. By continuing to extend the main lift cylinders on the gooseneck, the front tires of the disabled vehicle to be towed will be lifted off the ground to the desired height.

At this point, the lifting forces will be transferred to the hauling vehicle at a point ahead of the rear axle. This provides the weight distribution needed so that the use of a counterweight is not needed as in the prior art.

The key concept driving the present invention is the use of the main lift cylinders on the gooseneck along with a connection or attachment point on a substantial portion of the frame of the disabled vehicle to induce a rotation on the front of the disabled vehicle in order to lift it into the towing position. There are several key problems that the invention solves and several key advantages to this invention listed below.

With the inventive concept, a towing extension is attached to an existing toe or the existing toe is modified so that it has the features of the invention. The toe assembly can either be modified or replaced depending on the scope of the project and the combination of trucks to be towed. The towing extension module can be a permanent extension module or it can be one that can be installed and removed when necessary. Another embodiment includes the ability to move the toe extension between an operative position for towing and a storage position, where it is out of the way of where the toe needs to be used in hauling mode.

This embodiment is shown in FIGS. 4 and 5. FIG. 4 shows vehicle 21 and gooseneck assembly 25 in position for hauling a lowboy trailer 90. As is known, the hook 37 of the gooseneck assembly 25 engages a shaft of the lowboy trailer 90. Prior to this engagement, the toe extension 52 is put into the storage position by action of the cylinder assembly 57. The rod of the cylinder assembly 57 is retracted, the toe extension 52 is pivoted at 53, and the free end 63 moves upwardly so that the toe extension 52 does not interfere with the engagement between the hook 37 and the shaft of the lowboy trailer 90. Because of the length of the toe extension 52, its underside 91 and free end 63 could contact the top of the lowboy trailer in the vicinity 93, when the gooseneck is moved toward the lowboy trailer for trailer engagement.

FIG. 5 shows the lifting of the lowboy trailer 90 with the toe extension 52 in its storage position.

Advantages of the inventive towing apparatus and method are as follows.

With the inventive towing apparatus, the lifting forces will be applied downward on the hauling vehicle ahead of the rear axle. This gives a better weight distribution on the hauling vehicle and eliminates the need for a counterweight.

The new method of towing will eliminate the need for a subframe, towing apron with larger cylinders, guide frame, slide cylinders and slide cylinder assembly that is normally required on the hauling vehicle if towing and hauling are both desired. Thus, the complexity that is inherent to these systems and components is eliminated.

Turning will be much better because it will be rotating on a heavy duty turntable, which is designed for hauling lowboy trailers of much higher weights than disabled vehicles and the turntable has large greased plates that can be easily maintained. Using this type of rotatable connection between the gooseneck and the hauling vehicle means that a hauling vehicle will be able to turn more than 90°, similar to the capability when hauling a lowboy trailer. Also, it will be much more obvious to the operator when turning limits would be approached.

Rotation side to side will be allowed for at the turntable, the same as with the lowboy hauling.

This design will inherently provide an improved locking system over the bumper attachment of the prior art.

Since the components that are necessary for a gooseneck assembly that does both hauling and towing are not required, goosenecks that are designed for hauling only can easily be retrofitted at low cost.

Because of the number of components eliminated with this design, there is a significant weight reduction and therefore the performance when towing will be much better for a given combination of hauling vehicle and disabled vehicle.

The slide cylinders needed for the existing design to slide the gooseneck back and forth from the lowboy position to the towing position are no longer needed for the new design. With the current method of towing, the main lift cylinders are being used in the less effective direction (retracting operation: the rod area is subtracted from the overall area for the pressure calculations=less force generated with the same pressure due to decreased area in this direction). The new method uses the cylinders in the more efficient direction (extending operation: full area of cylinder is used in pressure calculations=full capability). In other words, with the new design the main lift cylinders are used the same as in the lowboy configuration.

This design improves the safety for the operators because it eliminates many of the steps required with the existing system; for example, handling the counterweights, accessing the bayonet pins on the subframe and putting someone under the truck while connecting.

This design keeps many of the functions similar to the Lowboy operation, which will help with training and consistency of operations. This should help reduce the damage from misuse when going from the Lowboy to Towing configurations.

As such, an invention has been disclosed in terms of preferred embodiments thereof which fulfills each and every one of the objects of the present invention as set forth above and provides a new and improved gooseneck assembly design for hauling disabled vehicles.

Of course, various changes, modifications and alterations from the teachings of the present invention may be contemplated by those skilled in the art without departing from the intended spirit and scope thereof. It is intended that the present invention only be limited by the terms of the appended claim.

I claim:

1. A gooseneck assembly comprising:
   a) a gooseneck adapted with one end to be mounted to a hauling vehicle for pivoting on a horizontal axis and rotating on a vertical axis;
   b) a toe having a first end rotatably mounted to the gooseneck, a second end movably mounted to the gooseneck, a third end, the third end having an underside surface adapted to contact a low boy trailer for low boy trailer lifting and hauling, and
   c) a toe extension, the toe extension extending from the third end of the toe, away from the gooseneck, and in a length to be positioned underneath a frame portion of the disabled truck in a first position, the toe extension having a free end,
   d) means for attaching the toe extension to the frame portion of the disabled vehicle at the free end of the toe extension,
   e) wherein the toe extension is movable with respect to the toe between the first position and a second position, the first position allowing the toe extension to be positioned underneath the frame portion of the disabled vehicle for attachment to the frame portion and disabled vehicle towing, the second position allowing the underside surface of the toe to contact the low boy trailer for low boy trailer lifting and hauling.

2. The assembly of claim 1 in combination with a vehicle having front and rear wheels, wherein the one end is mounted ahead of the rear wheels and the vehicle has a lifting assembly mounted thereto for raising and lowering the gooseneck.

3. The assembly of claim 1, wherein the toe extension has a generally flat shoulder and the generally flat shoulder is positioned along a length of the toe extension so that the generally flat shoulder abuts a front face of a bumper of the disabled vehicle.

4. A gooseneck assembly comprising:
   a) a gooseneck adapted with one end to be mounted to a hauling vehicle for pivoting on a horizontal axis and rotating on a vertical axis;
   b) a toe having a first end rotatably mounted to the gooseneck, a second end movably mounted to the gooseneck, and a third end,
   c) a toe extension extending from the third end, the toe and the toe extension movable between a first position where the toe extension can be attached to a disabled vehicle, and a second position, wherein the toe extension is used to lift a front end of a disabled vehicle,
   d) means for attaching the toe extension to a frame portion of the disabled truck at a free end of the toe extension, wherein the toe extension has an elongate and generally flat top surface extending from the toe to the free end of the toe extension, the elongate and generally flat top surface configured to be engageable with both a front bumper and a portion of a frame of the disabled vehicle, the frame portion spaced from the front bumper and extending rearward of the front bumper, wherein the toe extension is removably attachable to the toe.

5. A method of towing a disabled vehicle comprising:

providing a towing vehicle having a gooseneck assembly comprising:

a) a gooseneck adapted with one end to be mounted to a hauling vehicle for pivoting on a horizontal axis and rotating on a vertical axis;

b) a toe having a first end rotatably mounted to the gooseneck, a second end movably mounted to the gooseneck, and a third end, c) a toe extension extending from the third end, the toe and the toe extension movable between a first position where the toe extension can be attached to a disabled vehicle, and a second position, wherein the toe extension is used to lift a front end of a disabled vehicle, wherein the toe extension has an elongate and generally flat top surface extending from the toe to a free end of the of the toe extension, the elongate and generally flat top surface configured to be engageable with both a front bumper and a portion of a frame of the disabled vehicle, d) means for attaching the toe extension to a frame portion of the disabled truck at the free end of the toe extension, positioning the toe extension underneath a bumper and a frame portion of a disabled vehicle, the frame portion extending rearward of the bumper of the disabled vehicle, attaching the free end of the toe extension to the frame portion;

pivoting the toe with respect to the gooseneck to lift the disabled vehicle using the toe extension.

6. The method of claim 5, wherein the toe extension is removably attached to the toe.

7. The method of claim 5, wherein the toe extension is an integral part of the toe.

8. A method of towing a lowboy trailer comprising:

providing a towing vehicle having a gooseneck assembly comprising:

a) a gooseneck adapted with one end to be mounted to a hauling vehicle for pivoting on a horizontal axis and rotating on a vertical axis;

b) a toe having a first end rotatably mounted to the gooseneck, a second end movably mounted to the gooseneck, and a third end, and c) a toe extension, the toe and toe extension movable between a first position where the toe extension can be attached to a disabled vehicle, and a second position, wherein the toe extension is used to lift a front end of a disabled vehicle, d) means for attaching the toe extension to a frame portion of the disabled truck wherein the toe extension is movable between a storage position and an operative position, the operative position permitting towing of the disabled vehicle and the storage position permitting use of the toe for other hauling purposes, positioning the toe extension in the storage position, attaching a portion of the gooseneck to a portion of the lowboy trailer, pivoting the toe with respect to the gooseneck to lift the lowboy trailer while maintaining the toe extension in the storage position.

\* \* \* \* \*